May 26, 1936. R. W. LEACH ET AL 2,042,067
VALVE
Filed Jan. 17, 1933 7 Sheets—Sheet 1

Fig.1

Inventors
Robert William Leach and
William Henry Bateman
by English & Studwell
their Attorneys

Inventors
Robert William Leach and
William Henry Bateman
by English & Studwell
their Attorneys

Patented May 26, 1936

2,042,067

UNITED STATES PATENT OFFICE 2,042,067

VALVE

Robert William Leach and William Henry Bateman, Newport, England

Application January 17, 1933, Serial No. 652,128
In Great Britain February 23, 1932

7 Claims. (Cl. 251—51)

This invention relates to valves of various forms in which a closure member, or valve proper, co-operates with a fixed seating for controlling the passage of gas or liquid through the body of the valve, and has for its object to provide improved means for intermittently applying lubricant or sealing substance to the working surfaces of the valve.

The invention comprises a valve in which provision is made for a limited free relative movement between the closure member and its actuating member, and in which such relative movement is utilized for effecting a supply of lubricant or sealing substance to the working surfaces of the valve.

Also the invention comprises a valve as aforesaid in which the working surfaces are adapted so that they can be pressed together by the lubricant or sealing substance.

In the seven accompanying sheets of explanatory drawings:—

Figure 1:
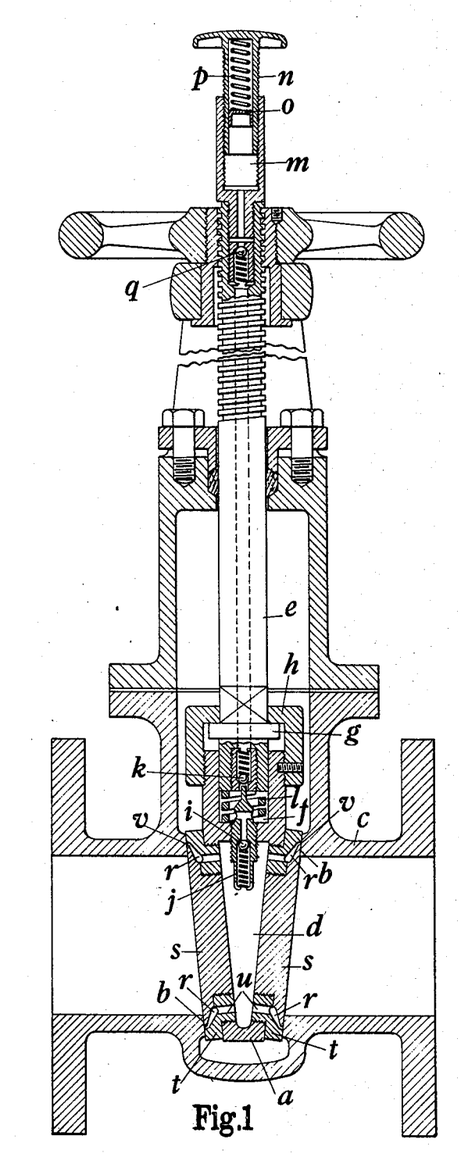
Figure 1 is a section of a sluice valve provided with this invention.

Referring to Figure 1 in which the closure member $a$, having oppositely inclined faces is movable between correspondingly inclined and fixed annular seating surfaces $b$ in the body part $c$, we form a chamber $d$ in the member $a$ for containing lubricant or sealing compound. (We desire it to be understood that the term lubricant is used herein to include any liquid, viscous or plastic substance which may be used for minimizing friction or for producing fluid tight contact between the working surfaces of the valve.)

The chamber $d$ is arranged in line with the usual screwed stem $e$ by which the member $a$ is moved on to or away from its seating, and one end of the stem is adapted to enter the open end of a chamber $f$ and act as a piston or plunger. Connection between the stem $e$ and member $a$ is effected by a collar $g$ on the former which is surrounded by a ring $h$ on the latter, and a small amount of free relative movement is provided by the ring and collar so that the stem can move in the direction of its length relatively to the member $a$. Communication between $d$ and $f$ is controlled by a non-return valve $i$ contained in a part $j$ which is adapted to control another non-return valve $k$ in the adjacent end of the stem $e$. The chamber $f$ contains a strong spring $l$ which tends to hold the closure member $a$ on its seating and returns the valve stem to its outermost limit in relation to the closure member in each opening operation of the valve.

The stem $e$ is preferably hollow and serves as a conduit along which the lubricant can be supplied to the chamber in the member $a$. The outer end of the stem may be adapted to form a lubricant reservoir $m$ which is fitted with a hollow screwed plug $n$ containing a piston $o$ by which lubricant can be expelled from the reservoir under the action of a spring $p$, down the stem to the chamber aforesaid. The outer end of the plug $n$ serves as a handle whereby it can be manipulated. A non-return valve $q$ is provided preferably at the lower end of the reservoir $m$ as shown.

When the valve is open the upper side of the collar $g$ on the stem $e$ abuts against the underside of the ring $h$ on the member $a$, and this relationship of the parts is preserved while the said member is being lowered on to its seating $b$. But when the member $a$ meets its seating, the stem can be given a further movement, which movement serves to force lubricant from the chambers $f$, $d$, along channels $r$ in the member $a$ to the seating surfaces. During this movement the part $j$ opens the valve $k$. The chamber $f$ is then separated from the reservoir $m$ only by the valve $q$. When the valve is again opened the first effect of the stem $e$ is to take up the free movement between the collar $g$ and the ring $h$ under the influence of the spring $i$ and during this movement lubricant can pass into the chamber $f$ from the reservoir $m$, this communication being closed only when the stem collar $g$ approaches the end of its movement towards the underside of the ring $h$. While the valve $k$ is open and lubricant is being expressed towards the seating surfaces $b$, return flow to the reservoir is prevented by the valve $q$.

Figures 2, 3:
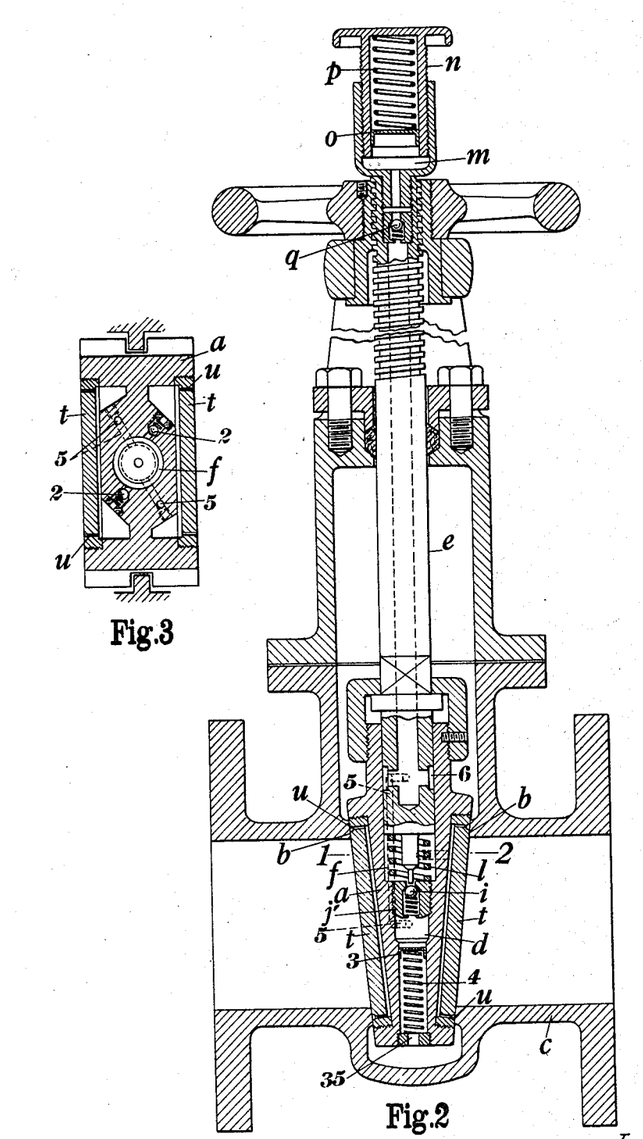
Figure 2 is a section illustrating a modified application of the invention to a sluice valve.
Figure 3 is a sectional plan of the same on the line 1—2.

The lubricant distributing channels in the member $a$ may be arranged in a variety of ways. Thus as shown in Figure 1 each of the outer surfaces of the part $a$ is formed by a plate $s$ which is screwed into a ring $t$, the latter being screwed into the hollow part $a$. The part $t$ is formed with a number of holes $u$ and these communicate with a narrow annular space $r$ between the parts $s, t$, this space terminating in a narrow annular slit $v$ through which the lubricant can pass to the seating $b$. Alternatively the construction shown in Figures 2 and 3 may be used. Here a plate $t$ is screwed into each side of the member $a$ and a ring of holes $u$ is formed in the plate $t$ the parts $a$ and $t$ being suitably shaped to provide between them a hollow space for lubricant as shown in Figure 3. The holes $u$ terminate in an annular groove, or the annular groove may be formed in the seating $b$ opposite the holes $u$ such as shown for example in the structure of Fig. 4. By suitable shaping the adjacent peripheral edges of the said parts, the cross section of the lubricant passage can be made to diminish from the rear to the exposed surface of the plate, thus obviating undue loss of pressure or restriction to flow of the lubricating or sealing substance, while exposing only a very small area at the surface of the plate. Such a construction is illustrated at Figure 1.

Figure 8:
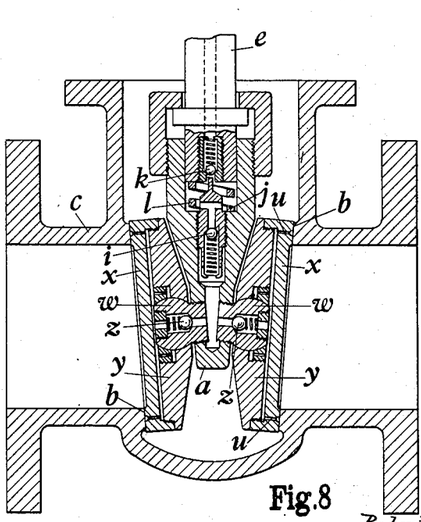
Figure 8 is a section illustrating a modification of the valve shown in Figure 1 or 2.

The modification shown in Figure 8 is essentially similar to the construction shown in Figure 1, excepting that the parts which cooperate with the seatings $b$ are made separately from the closure member $a$ attached to the stem $e$, and are connected to the part $a$ by spherically formed members $w$ secured to the part $a$. Each of the parts which co-operate with the seatings $b$ consists of screw connected members $x, y$, having a lubricant space between them, the part $x$ being formed with holes $u$ through which lubricant can pass to the seating surface. Also each of the spherically formed members $w$ contains a non-return valve $z$. In other particulars, the construction and mode of operation of the modification will readily be followed from inspection of Figure 8 and from the description of Figure 1.

The modification shown in Figures 2 and 3 differs mainly from Figure 1 in that the lubricant flows to the apertures $u$ in the faces of the parts $t$ directly from the chamber $f$ containing the strong spring $l$ through passages controlled by non-return valves 2 (Figure 3) and the spaces between the parts $a, t$. Beneath the part $j$ carrying the non-return valve $i$ is provided a cylindrical chamber $d$ containing a piston 3 acted on by a spring 4. The force exerted by this spring upon the piston may be supplemented by admission through the hole 35 of the fluid controlled by the valve to the underside of the piston, or this force may be substituted for that exerted by the spring.

The chamber $d$ communicates by passages 5 in the part $a$ with a groove 6 around the stem $e$ which groove is open to the interior of the stem. The lower end of the stem is closed and is adapted as shown to press the valve $i$ off its seating. After the part $a$ has been lowered so as to bring its faces $t$ into contact with the seatings $b$ further movement of the stem against the spring $l$ causes lubricant to be displaced from $f$ through the valves 2 to the apertures $u$. At the same time the valve $i$ is opened. During the return of the stem and before the valve $i$ is closed, lubricant can flow from $m$ along the stem $e$ and passage 5 to the chamber $d$ and thence to the chamber $f$, the flow to the chamber $f$ being stopped when the stem $e$ allows the valve $i$ to close. If desired the reservoir $m$ may be dispensed with and lubricating or sealing substance fed periodically to replenish the chamber $d$ by means of a grease gun nipple attachment to the outer end of the valve stem. The valve body $j'$ of Fig. 2 is generally similar in structure and operation to that shown at $j$ in Fig. 1, the only difference being that in Fig. 1 valve body $j$ is threaded into the lower end of the chamber $f$, while in Fig. 2 the valve body $j'$ is threaded into the body of the closure member $a$.

In all the constructions shown in Figures 1, 2, 3 and 8, no lubricant can escape through the apertures in the outer faces of the closure member $a$ when the latter is raised out of contact with the seatings $b$ and the necessary supply of lubricant to the chambers which feed those passages when the member $a$ is closed on to its seatings is maintained from the reservoir $m$ by the piston $o$ and spring $p$. Periodically an attendant screws down the plug $n$ by hand in order to keep the interior of the plug charged and the spring $p$ compressed.

Figure 4:
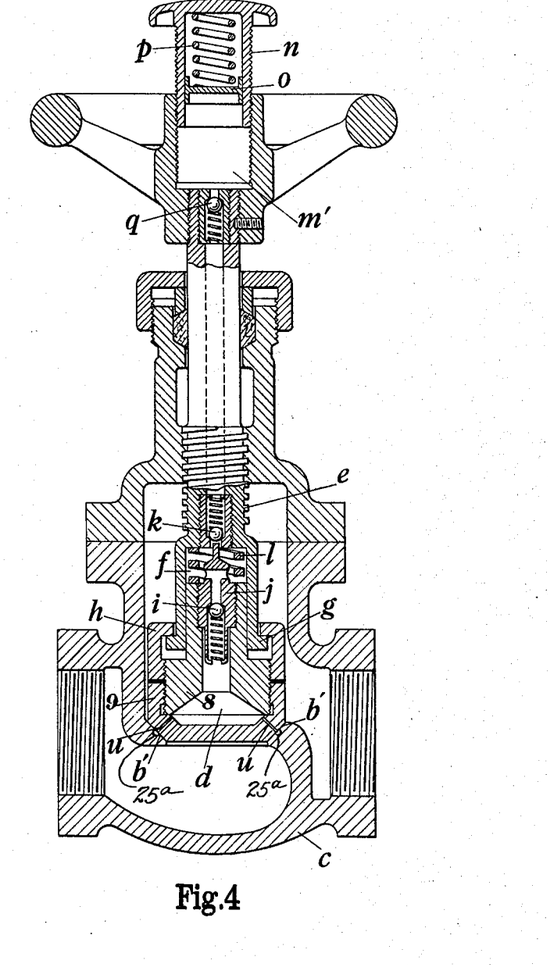
Figure 4 is a section illustrating an application of the invention to a valve of the type in which the interacting faces of the closure member and its seating are made to a conical form.

Referring now to Figure 4, there is here shown an application of the invention to an ordinary screw-down valve of the kind in which the closure member is formed with a conical surface adapted to co-operate with a conical seating $b'$. In the example shown, the movable part comprises a pair of screw connected inner and outer parts 8, 9 forming between them a chamber $d$. The part 9 is made conical at its lower end and is formed with lubricant apertures $u$ which terminate in an annular groove 25$a$ formed in the seating $b$. The lower end of the stem is formed with a collar $g$ adapted to engage a ring $h$ on the part 8 and the parts 8, 9, are adapted to permit a relative axial movement between them and the stem. Also a piston like extension is formed on the part 8 to enter a cylindrical chamber at the lower end of the stem $e$ containing the spring $l$. A fitting $j$ on the said extension carries a non-return valve $i$, and is adapted to open a non-return valve $k$ in the hollow stem. In other particulars the valve and its mode of operation resembles that already described in connection with Figure 1. The lubricant reservoir $m'$ of Fig. 4 is similar in function and operation to that shown at $m$ in Fig. 1. The reservoir $m'$ is shown as being integrally formed on the actuating wheel, whereas that shown at $m$ is threaded into the upper end of the actuating stem $e$. If desired the lower end of the closure member may be in the form of a flat surface adapted to co-operate with a flat annular seating, or the seating and the coacting part of the closure member may be of spherical form.

Figures 5, 6:
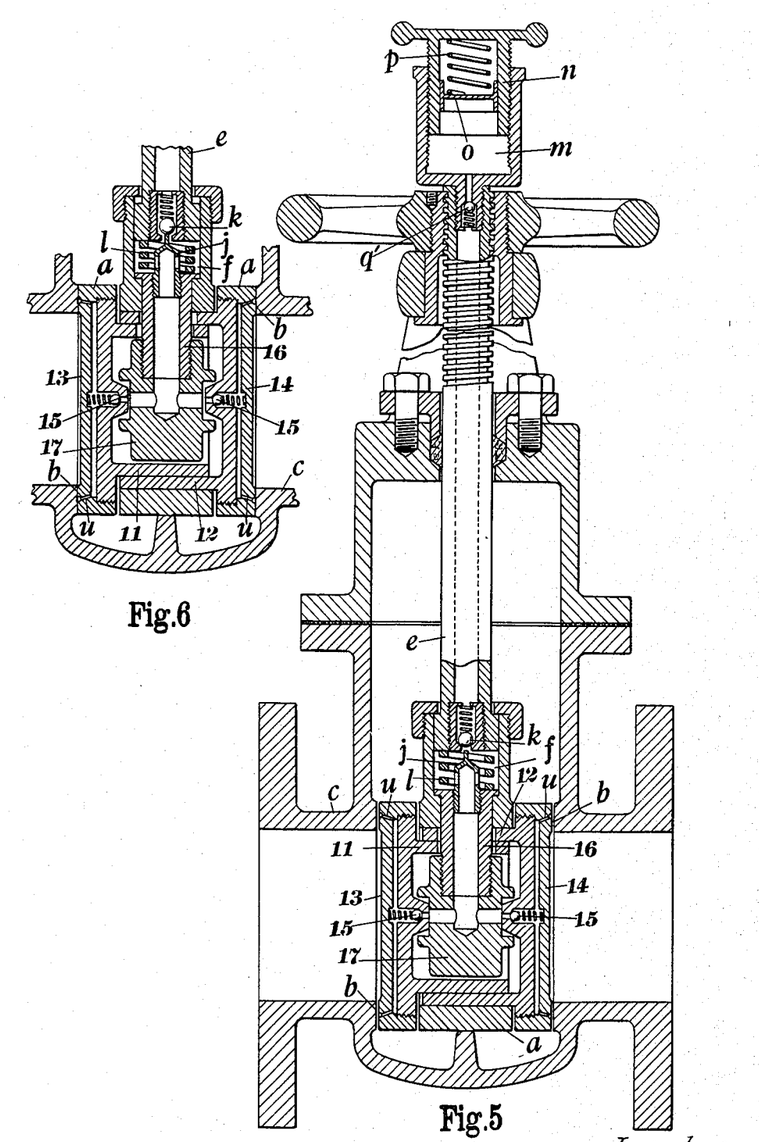
Figure 5 is a sectional view showing a valve in accordance with this invention in which the faces of the closure member can be forced laterally by fluid pressure into tight contact with their seatings.
Figure 6 shows the said faces in contact with the seatings.

In the example of sluice valve shown in Figures 5 and 6, the outer faces of the movable closure member $a$ are parallel with each other and are arranged to co-operate with parallel seatings $b$. This valve differs essentially from that shown in Figure 1 in that the end faces of the part $a$ are movable laterally in directions at right angles to the axis of the stem. After the valve part $a$ has been moved downwards to close the passage through the valve body part, the end faces are expanded laterally into tight contact with the seatings. Before the valve is opened the said faces are first retracted so as to release them, and afterwards the valve part *a* is raised by the stem. To enable these actions to be obtained, the part *a* is made of hollow cylindrical form, and adapted to receive a pair of telescopic hollow cylindrical parts 11, 12. On the part 11 is formed a valve face 13 and on the other is formed a valve face 14. Each of the valve faces is hollow and is provided with outlet apertures *u* through which lubricant can pass to the seatings *b*. The entrance to the interior of each face part is controlled by a non-return valve 15. Rotation of the parts 11, 12 relatively to the part *a* is prevented by a hollow extension 16 on the part *a* which passes through holes in the parts 11, 12. This extension also carries a hollow block 17 which can serve to limit the movement of the parts 11, 12 towards each other. Moreover the part 16 carries a fitting *j* which serves to move off its seating a ball valve *k* in the lower end of the stem *e*. Limited movement of the stem relatively to the part *a* is obtained in a similar manner to that employed in Figure 1.

After the valve parts *a*, 11, 12 have been moved to the position shown in Figure 5 for closing the passage in the body, continued movement of the stem *e* against the spring *l* causes lubricant to be forced from the chamber *f* into the space between the parts 11, 12 and also causes the valve *k* to be opened. The effect of this displacement of lubricant is to force the parts 11, 12 against the seatings *b* as shown in Figure 6, and further movement of the stem causes lubricant to pass to the seating surfaces through the apertures *u*. When opening the valve, the stem *e* rises and before it completes its upward movement relative to the closure member, the ball valve *k* closes, which permits the retraction of the valve faces. In other respects the construction and mode of operation of the mechanism is generally similar to that shown in Figure 1. The ball valve *q'* shown in Fig. 5 is similar in function and operation to the valve *q* in Fig. 1, except that in Fig. 5 the valve is mounted within the integral end of the reservoir *m*, whereas in Fig. 1 the valve *q* is situated in a short threaded bushing located in the actuating stem *e* directly below the lower threaded end of the reservoir *m*.

Figure 7:
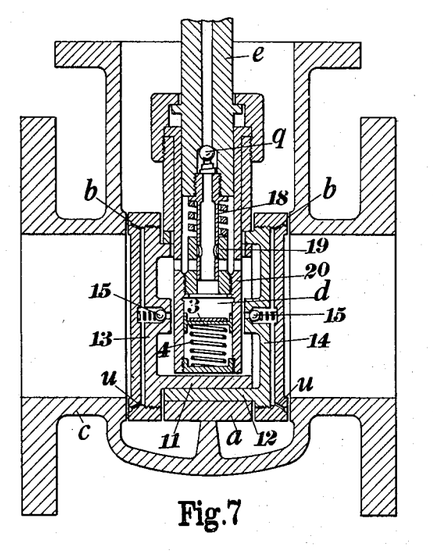
Figure 7 is a section illustrating a modification of the valve shown in Figures 5 and 6.

The modification shown in Figure 7 differs mainly from that shown in Figures 5 and 6 in that the closure member *a* is provided with a chamber *d*, piston 3 and spring 4 somewhat similar to that already described in connection with Figure 2, and that communication between this chamber and the valve faces is definitely cut off when the valve is open. The chamber *d* serves the same purpose as the reservoir *m* shown in Figures 5 and 6. At the lower end of the stem *e* is a hollow extension 18 having an open lower end and also side passages as shown. This part slides in a part 19 fixed within a hollow cylindrical part 20 attached to the part *a*. When the various components are in the position shown the part 18 shuts off the communication between the chamber *d* and the interiors of the parts 13, 14 but always permits one-way communication between the hollow stem and reservoir *d*. In this position the valve has been closed, but the parts 13, 14 have not been pressed on to their seatings *b*. Downward movement of the stem relatively to *a* causes 18 to open the communication and allow lubricant to act on the parts 13, 14 causing them to be pressed on their seatings. Further movement causes lubricant to pass to the seating surfaces. In the drawings an appreciable clearance is shown between the parts 13, 14 and the seating surfaces, but in practice this clearance is very small. On raising the stem the first effect is to cause 18 to shut off the passages leading from *d* to the parts 13, 14, at the same time retracting the parts 13 and 14, the stem *e* acting as a piston on its suction stroke. Afterwards the stem lifts the said parts, through the medium of the part *a* for the purpose of opening the main passage through the valve. The charge of lubricant in *d* is renewed periodically by means of the hand operated device at the upper end of the stem, as already described, return flow from *d* along the stem being prevented by the valve *q*.

Figure 9:
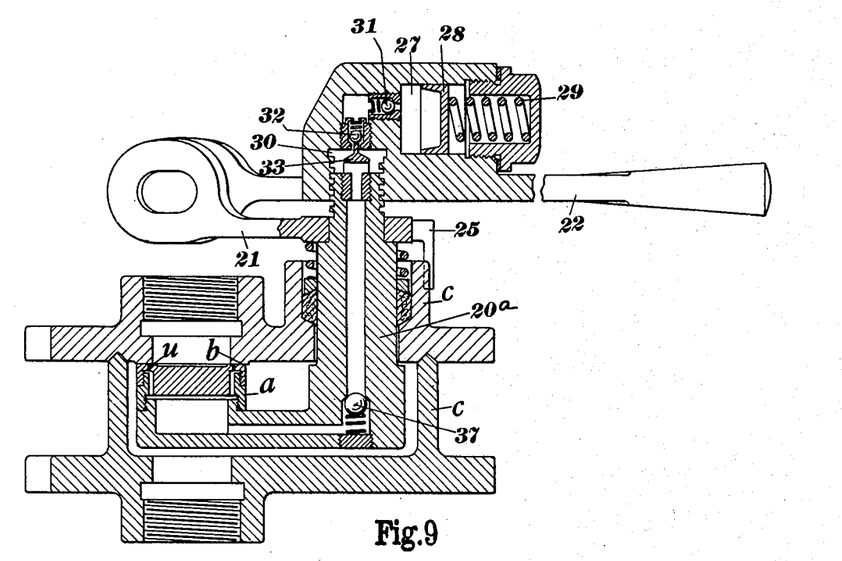
Figure 9 is a sectional plan and Figure 10 a sectional end view showing an application of the invention to a valve of the oscillatory type.
Figure 10:
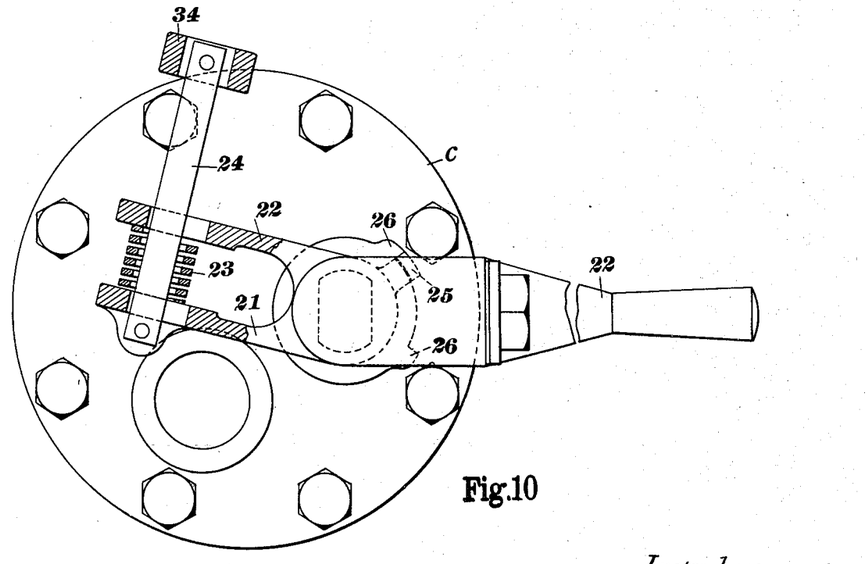

The valve shown in Figures 9 and 10 comprises a hollow closure member *a* which is movable by an angular or oscillatory movement relatively to a flat seating *b* in the hollow body part *c*. The part *a* is formed or arranged on a hollow spindle 20*a* which extends at one end beyond the body part, and on this end is secured an actuating lever 21. The latter is moved by a hand lever 22 through the medium of a spring 23 relative movement between the lever being limited by a stem 24. The movement of the lever 21 and valve *a* relatively to the body part is limited by a part 25 on the lever 21 engaging stops 26 on the body *c*.

It will be seen that a screw thread is formed on the outer end of the spindle, and this thread is engaged by a corresponding thread formed on the interior of a cavity 30 in the hand lever 22. Further the hand lever has formed or provided on it a hollow lubricant chamber 27 containing a piston 28 which is acted on by a spring 29. The communication between the chamber 27 and cavity 30 is controlled by a pair of non-return valves 31 and 32, and the latter can be pushed off its seating by a hollow fitting 33 on the adjacent end of the spindle 20*a*. A non-return valve 37 located in the hollow spindle prevents return flow to the cavity 30.

Movement of the part *a* between its open and closed positions is effected by the hand lever 22 acting through the spring 23 and lever 21. After the part *a* has been closed the hand lever 22 can continue to move relatively to the spindle 20*a* and this movement is accompanied by axial movement of the lever 22 on the spindle due to the screw thread connection aforesaid. In this movement lubricant is expressed from the cavity 30 along the hollow spindle to the interior of the valve *a* and thence through apertures *u* to the seating surface. During this movement the valve 32 is lifted off its seating, and is held off its seating during the return movement of the hand lever sufficiently to allow the cavity 30 to be replenished by flow of lubricant into it from the chamber 27 under the action of the piston 28 and spring 29. Continued reverse movement of the hand lever 22 causes the part *a* to be moved to the open position of the valve.

Should the part *a* stick while being moved from the open to the closed position, the lever 22 can move relatively to the spindle and force lubricant to the valve seating, thus freeing the valve *a*. In Figure 10 the spring 23 between the levers 21, 22 is shown fully compressed, a position which is normally only assumed after the valve has been closed and lubricant is being forced on to the seating by extra movement of the hand lever. During the closing of the valve the spring is normally compressed to a less extent, its stiffness being such that it can transmit motion from 22 to 21 with but little compression. In the opening movement of the valve the lever 22 operates the lever 21 through the collar 34 fastened on the outer end of the stem 24. That is to say, when the lever 22 is moved in a clockwise direction, as viewed in Fig. 10, the end portion thereof surrounding the stem 24 moves outwardly and abuts against the collar 34, which action turns the lever 21, causing it to swing the closure member a to open position.

The invention is not limited to the examples above described and subordinate details can be varied to suit different requirements. If desired the valves may be provided with other passages than those described for lubricating surfaces other than the seating surfaces. Also instead of utilizing the movement of the stem e relatively to the closure member a for expressing lubricant from a chamber within the part a, such relative movement may be utilized to control the passage of lubricant to the valve surfaces from a reservoir in which the lubricant is stored under pressure, the required flow of lubricant being only permitted when relative movement occurs between the stem e and closure member a. Thus in the construction shown in Figure 11 the hollow stem e communicates at its outer end with a lubricant reservoir in a similar manner to the valve shown in Figure 1. The lower end of the stem is closed and is supported by a strong spring l. The said end is also slidable in a cylindrical chamber in the part a, and is formed with side passages 35 which can communicate with passages 36 in the part a. In this example the part a is provided with swivelled face pieces y similar to those already described and illustrated in Figure 8. When the stem e is moved downwards against the spring l, after the closure member has made contact with the seatings b, the passages 35 are brought into alignment with the passages 36, and lubricant can then pass to the faces of the parts y under the pressure exerted by the spring p on the piston o in the reservoir at the outer end of the stem.

Figure 11:
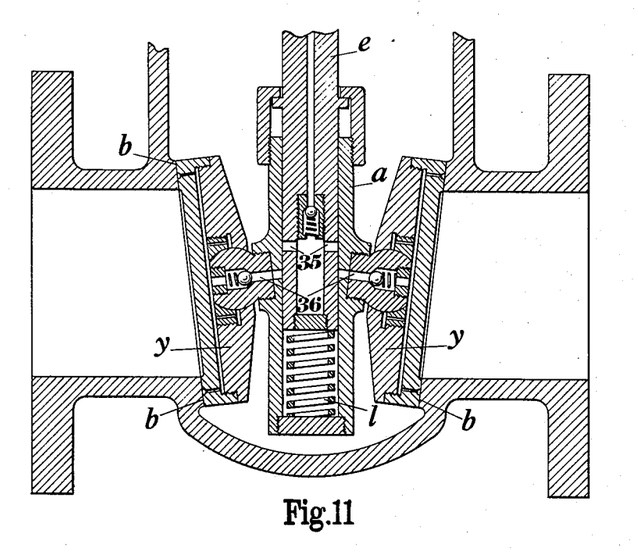
Figures 11 and 12 illustrate two further modifications in which the relative movement of stem and closure member is utilized to establish connection with a lubricant or like reservoir.
Figure 12:
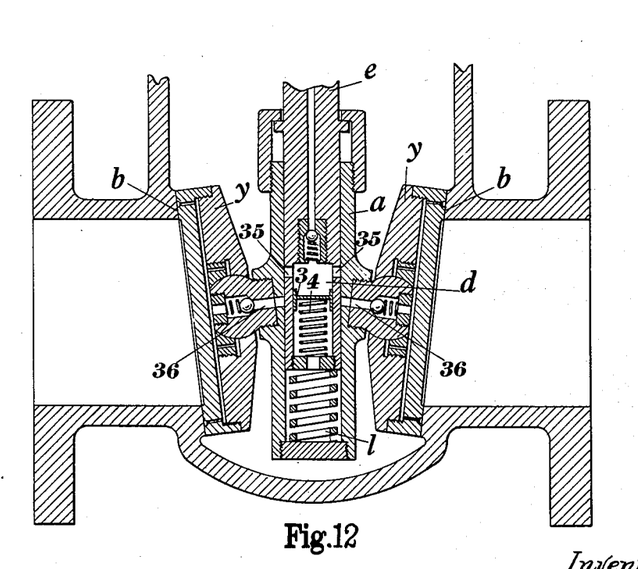

The modification shown in Figure 12 is essentially similar to that shown in Figure 11, excepting that the lower end of the stem is provided with the cylindrical chamber d containing a piston 3 and spring 4 analogous to the arrangement shown in Figure 2. When the passages 35, 36 are brought into coincidence, lubricant is expressed from d to the valve faces by the spring 4 and piston 3. In both of these modifications, the communication through 35, 36 is closed when the stem is returned to the position shown in the drawings.

Having thus described our invention what we claim as new and desire to secure by Letters Patent is:—

1. In a valve, the combination of a movable hollow closure member, a seating with which the said member can co-operate, and an operating stem for controlling the movement of the closure member toward the seating, said stem being movable through a limited distance relatively to the closure member and adapted by supplemental movement after it has seated the closure member to express lubricating or sealing substance from the interior of the closure member to the working surfaces of the seat and closure member and means for preventing the delivery of lubricant to at least a part of said interior after the operating stem has performed its supplemental movement in a reverse direction to that required for expressing the lubricant, substantially as described.

2. In a valve, the combination of a movable hollow closure member, a seating with which the said member can co-operate, said valve having a source of supply of lubricating and sealing substance and a hollow operating stem having a longitudinally extending passage forming a lubricant-conducting conduit and movable through a limited distance relatively to the closure member and adapted to interrupt or establish communication between the working surfaces of the closure member and seating and the source of supply of lubricating and sealing substance, substantially as described.

3. In a valve, the combination of a movable hollow closure member, a seating with which said member can cooperate, an operating stem for controlling the movement of the closure member toward said seating, said stem being movable through a limited distance relatively to the closure member and adapted by supplemental movement after it has seated the closure member to express lubricating and sealing substance from the interior of the closure member to the working surfaces of the seat and closure member, and automatic non-return valves for permitting the flow of lubricating and sealing substance to the working surfaces of the valve when the closure member is in the closed position and after the operating stem has performed its supplemental movement, and preventing such lubricating and sealing substance from escaping from the interior of the hollow closure member before the closure member is moved to open position, the closing movement of the automatic non-return valves being governed by the movement of the operating stem in a direction reverse to that in which the stem moves in seating the valve.

4. An oscillating valve comprising, the combination of a hollow closure member, a hollow spindle carrying the closure member, a hand lever in screw connection with one end of the spindle, an actuating lever in direct connection with the spindle, a spring connection between the levers, and a reservoir for lubricant and sealing substance on the hand lever from which lubricant or sealing substance is expressed by relative movement of the hand lever and spindle, substantially as described.

5. In a valve, the combination of a movable closure member, a seating with which said closure member can cooperate, an actuating member connected to the closure member for controlling the movements of the closure member toward the seating, said actuating member having a limited free relative movement with respect to the closure member, the actuating member effecting a supply of lubricating and sealing substance to the working surfaces of the valve by a supplemental movement relative to the closure member after the closure member has been seated and means for shutting off the supply of lubricating and sealing substance to the working surfaces, by a reverse supplemental movement of the actuating member preparatory to separating the closure member from its seating.

6. In a valve, the combination of a movable hollow closure member, a seating with which said closure member cooperates and with which the interior of the hollow closure member communicates, an operating stem movable through a limited distance relatively to the closure member, a valve adapted to establish communication between the working surfaces of the closure member and seating and a source of lubricating and sealing substance after the closure member has been pressed against its seating, said valve being interposed between the source of lubricating and sealing substance and the interior of the hollow closure member, means for opening the valve on movement of the stem relative to the closure member after the closure member is seated, and means for closing said valve when the stem is moved with a reverse movement relatively to the closure member and prior to the separation of the closure member from its seating.

7. In a valve, the combination of a movable hollow closure member, a seating with which said closure member cooperates and with which the interior of the hollow closure member communicates, said valve having a source of lubricating and sealing substance, an operating stem for controlling the movement of the closure member toward the seating, said stem being movable through a limited distance relatively to the closure member by supplemental movement after it has seated the closure member, check valves so located as to interrupt or establish communication between the working surfaces of the closure member and seating and the source of lubricating and sealing substance, the opening and closing movements of said valves being governed by the supplemental movement of the operating stem, the closure member being provided with laterally movable parts pressed by the pressure of the lubricating and sealing substance against the seating.

ROBERT WILLIAM LEACH.
WILLIAM HENRY BATEMAN.